(12) United States Patent
Wolford

(10) Patent No.: US 10,571,998 B2
(45) Date of Patent: Feb. 25, 2020

(54) SYSTEMS AND METHODS FOR OPERATING COMPUTING DEVICES AT PEAK POWER EFFICIENCY IN REAL TIME

(71) Applicant: Lenovo Enterprise Solutions (Singapore) Pte. Ltd., New Tech Park (SG)

(72) Inventor: Robert R. Wolford, Research Triangle Park, NC (US)

(73) Assignee: Lenovo Enterprise Solutions (Singapore) Pte. Ltd., New Tech Park (SG)

(*) Notice: Subject to any disclaimer, the term of this patent is extended or adjusted under 35 U.S.C. 154(b) by 143 days.

(21) Appl. No.: 15/673,348

(22) Filed: Aug. 9, 2017

(65) Prior Publication Data
US 2019/0050047 A1 Feb. 14, 2019

(51) Int. Cl.
*G06F 1/3296* (2019.01)
*G06F 1/3237* (2019.01)
*G06F 1/324* (2019.01)
*G06F 11/34* (2006.01)
*G06F 1/329* (2019.01)

(52) U.S. Cl.
CPC ............ *G06F 1/3296* (2013.01); *G06F 1/324* (2013.01); *G06F 1/3237* (2013.01); *G06F 11/3423* (2013.01); *G06F 1/329* (2013.01); *G06F 11/3409* (2013.01)

(58) Field of Classification Search
CPC ...... G06F 1/3296; G06F 1/3237; G06F 1/324; G06F 11/3423; G06F 1/329; G06F 11/3409
USPC ............... 713/300, 340, 1; 709/220; 307/80; 323/266
See application file for complete search history.

(56) References Cited

U.S. PATENT DOCUMENTS

| | | | | |
|---|---|---|---|---|
| 6,937,487 B1* | 8/2005 | Bron | ...................... | H02M 3/073 323/266 |
| 2005/0028017 A1* | 2/2005 | Janakiraman | ........... | G06F 1/263 713/340 |
| 2006/0149975 A1* | 7/2006 | Rotem | .................... | G06F 1/206 713/300 |
| 2007/0046284 A1* | 3/2007 | Renken | ............. | H01L 21/67253 702/58 |
| 2007/0049133 A1* | 3/2007 | Conroy | .................... | G06F 1/26 439/894 |
| 2008/0320322 A1* | 12/2008 | Green | ....................... | G06F 1/26 713/340 |
| 2009/0271649 A1* | 10/2009 | Loffink | ................... | G11C 5/147 713/340 |

(Continued)

Primary Examiner — Aurel Prifti
(74) Attorney, Agent, or Firm — Olive Law Group, PLLC

(57) ABSTRACT

Systems and methods for operating computing devices at peak power efficiency in real time are disclosed. According to an aspect, a method includes analyzing a set of input and output characteristics of a component operable on a computing device servicing one or more workloads. The method also includes determining whether an efficiency metric associated with the component is met based on the set of input and output characteristics. Further, the method includes setting an indicator in response to determining that the efficiency metric is met. Further, the method includes assigning additional workload to another computing device based on whether the indicator is set.

20 Claims, 4 Drawing Sheets

(56) References Cited

U.S. PATENT DOCUMENTS

| | | | | |
|---|---|---|---|---|
| 2010/0164292 A1* | 7/2010 | Freeman | ............... | G06F 1/263 |
| | | | | 307/80 |
| 2011/0320838 A1* | 12/2011 | Jenne | ................. | G06F 1/3203 |
| | | | | 713/320 |
| 2012/0096248 A1* | 4/2012 | McCarthy | ............ | G06F 1/3203 |
| | | | | 713/1 |
| 2012/0290691 A1* | 11/2012 | Buendgen | ............ | G06F 9/5061 |
| | | | | 709/220 |
| 2013/0166250 A1* | 6/2013 | Vijaykumar | ........ | G06F 11/3062 |
| | | | | 702/182 |
| 2013/0339776 A1* | 12/2013 | Jagadishprasad | ..... | G06F 9/5094 |
| | | | | 713/340 |
| 2015/0082055 A1* | 3/2015 | Grout | ....................... | G06F 1/26 |
| | | | | 713/300 |
| 2017/0357305 A1* | 12/2017 | Kunnathur Ragupathi | ............... | |
| | | | | G06F 1/3209 |

\* cited by examiner

SYSTEMS AND METHODS FOR OPERATING COMPUTING DEVICES AT PEAK POWER EFFICIENCY IN REAL TIME

TECHNICAL FIELD

The presently disclosed subject matter relates to power management for computing devices. More particularly, the presently disclosed subject matter relates to systems and methods for operating computing devices at peak power efficiency in real time.

BACKGROUND

In order to improve performance and operating efficiency of electronic devices, it is important to properly analyze and manage their power consumption. As an example, computing devices having a voltage regulator device (VRD) are often assigned variable workloads with little or no regards to the workload's distribution and its impact on the computing device's power consumption. This can be troublesome because the device can then operate using either too little or too much power. Either case results in a waste of resources because the optimal peak power consumption and correspondingly, efficiency, are not being utilized. Such wastes can include lost productivity, operating efficiency, time, and money. This problem is further magnified when a multitude of computing devices are used because those lost resources get compounded. While energy efficiency curves have been used to determine operating power efficiency, such curves are usually created using static sets of data. As such, these curves are unable to help the device stay in peak power efficiency mode because the assigning of workloads onto the device creates dynamic data sets that must be accounted for. Specifically, the addition of workloads onto a device result in power consumption changes that must then be used to recalibrate the curves to ensure that the device is operating in the optimal region. Due to the static nature of the present curves, computing devices cannot and are not being used most efficiently.

In another example, datacenters contain many computing devices, such as servers. Workloads are often distributed en masse to servers with little to no regards to the servers' energy efficiency, much like in the example above. Datacenters generally exhibit a high sensitivity to power consumption because they often need to consume high levels of power to operate the servers. As such, datacenters often rely on energy efficiency curves to determine peak operating efficiency. However, those curves are generated based on static data collected at various usage and corresponding power consumption levels. Yet, as the amount of workload placed onto the server changes, so too does the server's power consumption needs. These curves fail to reflect such changes since they are based on past data. In addition to workload changes, hardware configurations can also change, resulting in a corresponding power consumption change. In either case, the energy efficiency curves relied upon by the datacenters become outdated and can no longer predict optimal peak power consumption and efficiency. To obtain and analyze this dynamic data, cumbersome hardware must be added onto each server, along with a communication interface in order to transmit the data for recalibration of the energy efficiency curves. For a datacenter with thousands upon thousands of servers, this process is extremely costly and tedious. Therefore, implementation of this process is an untenable solution. Another solution is needed that is elegant, simple-to-implement, and cost-effective.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are systems and methods for systems and methods for operating computing devices at peak power efficiency in real time. According to an aspect, a method includes analyzing a set of input and output characteristics of a component operable on a computing device servicing one or more workloads. The method also includes determining whether an efficiency metric associated with the component is met based on the set of input and output characteristics. Further, the method includes setting an indicator in response to determining that the efficiency metric is met. The method also includes assigning additional workload to another computing device based on whether the indicator is set.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

Figure 1:
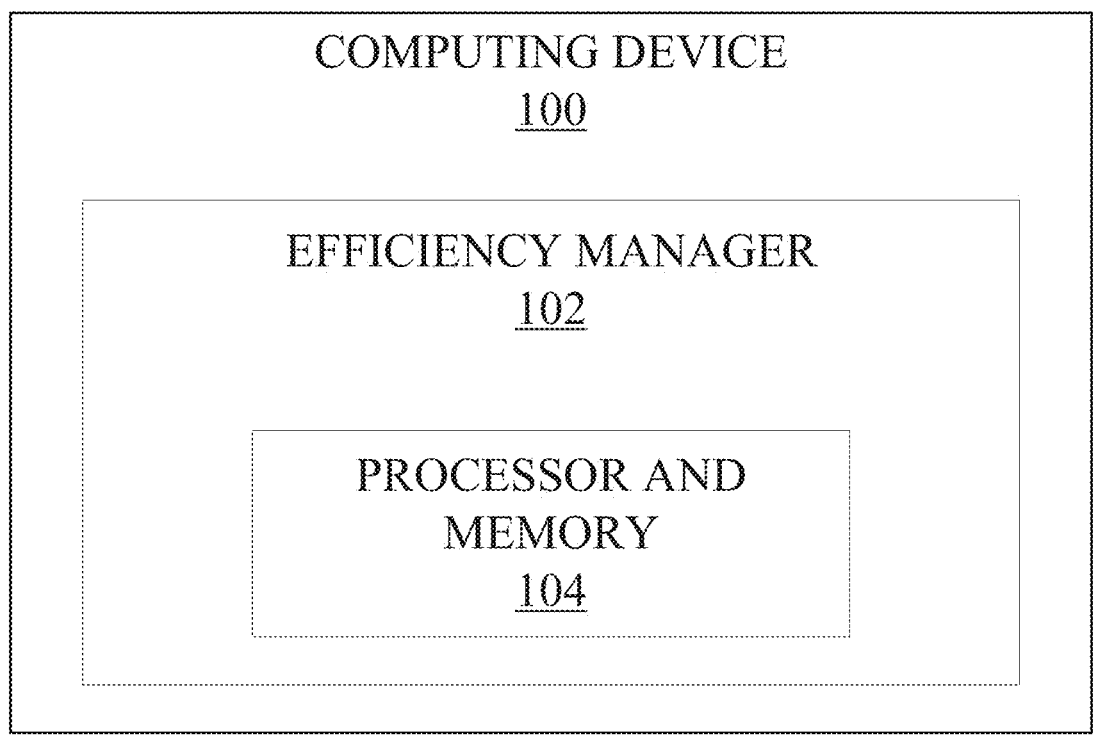
FIG. 1 is a block diagram of an example system for systems and methods for operating computing devices at peak power efficiency in real time in accordance with embodiments of the present disclosure.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies.

For optimal operation of a computing device, it is desirable to obtain the device's power consumption in real time to determine whether the device can handle additional workloads. As an example, datacenters contain a multitude of computing devices, such as servers, that can require real-time data monitoring and feedback to determine whether the servers are operating at peak power efficiency.

The presently disclosed subject matter can provide real-time feedback so that the server does not become overworked and end up operating at non-peak power efficiency. The ability to monitor, view, and utilize this real-time feedback as additional workloads are placed onto the server can enable the server to operate faster and more efficiently, since it may be operating at peak power efficiency and is not being inundated with too many workloads. In accordance with the embodiments, the present disclosure provides systems and methods for operating computing devices at peak power efficiency in real time.

As referred to herein, the term "computing device" should be broadly construed. It can include any type of device including hardware, software, firmware, the like, and combinations thereof. A computing device may include one or more processors and memory or other suitable non-transitory, computer readable storage medium having computer readable program code for implementing methods in accordance with embodiments of the present disclosure. A computing device may be, for example, a server. In another example, a computing device may be any type of conventional computer, such as a laptop computer or a tablet computer or a desktop computer. In another example, the computing device may be a type of network device such as a router or a switch. In another example, the computing device may be a smart television or a high definition television. In another example, the computing device may be a battery powered Internet of Things (IoT) device. In another example, the computing device may be a video disc player (e.g. BLU-RAY DISC®, BLU-RAY 3-D®, or the like). In another example, a computing device may be a mobile computing device such as, for example, but not limited to, a smart phone, a cell phone, a pager, a personal digital assistant (PDA), a mobile computer with a smart phone client, or the like. A typical mobile computing device is a wireless data access-enabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on servers in a datacenter, the examples may similarly be implemented on any suitable computing device or computing devices.

The presently disclosed subject matter is now described in more detail. For example, FIG. 1 illustrates a block diagram of an example system for systems and methods for operating computing devices at peak power efficiency in real time. Referring to FIG. 1, the system includes a computing device 100 containing an efficiency manager 102 and a processor and memory 106. The computing device 100 may be any suitable computer such as a laptop computer, a tablet computer, or a desktop computer. In another example, the computing device may be a type of network device such as a router or a switch. In another example, the computing device 100 may be a mobile computing device. In another example, the computing device 100 may be a server. In yet another example, the computing device 100 may be a smart television or a high definition television or a video disc player (e.g. BLU-RAY DISC®, BLU-RAY 3-D®, or the like). In yet another example, the computing device may be a battery powered Internet of Things (IoT) device. The efficiency manager 102 may be implemented by hardware, software, firmware, or combinations thereof. The efficiency manager 102 is a broad term used to denote an element that interacts with the computing device 100 and the processor and memory 104 to determine if the computing device 100 is operating at peak power efficiency. In one example, the efficiency manager 102 can be a program that monitors the efficiency metric of the computing device 100 to determine whether the device is operating at peak power efficiency. In another example, the efficiency manager 102 can be a real-time computing chip such as a microcontroller or a field-programmable gate array (FPGA) that collects the raw data from the computing device 100 to calculate the efficiency in real time and set an indicator flag denoting that peak power efficiency has been achieved.

Figure 2:
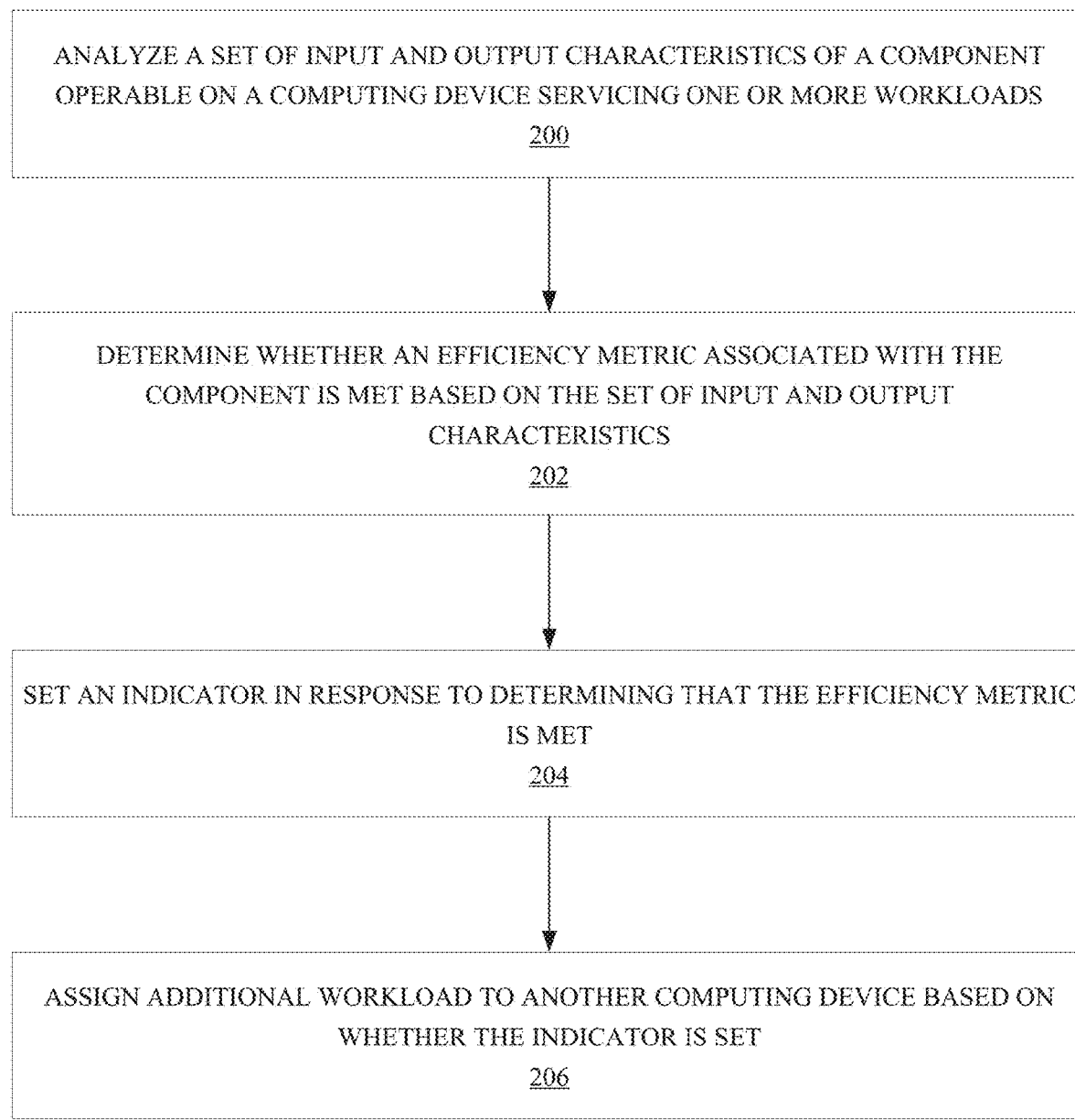
FIG. 2 is a flow chart of an example method for implementing systems and methods for operating computing devices at peak power efficiency in real time in accordance with embodiments of the present disclosure.

FIG. 2 illustrates a flow chart of an example method for systems and methods for operating computing devices at peak power efficiency in real time in accordance with embodiments of the present disclosure. The method of FIG. 2 is described by example as being implemented by the computing device 100 shown in FIG. 1, although it should be understood that the method may be implemented by any suitable computing device(s). Additionally, reference is also made to the flow chart shown in FIG. 3, which is described in further detail herein in accordance with embodiments of the present disclosure.

Referring to FIG. 2, the method includes analyzing 200 a set of input and output characteristics of a component operable on a computing device 100 servicing one or more workloads. In one example, the component operable on a computing device 100 is a voltage regulator device (VRD) that can be used to monitor the input and output characteristics of the computing device 100. The term workload as used herein is a broad term used to denote the amount of work that a computing device 100 has to do in some time interval. In an example, a workload may include executing a program. In another example, a workload may include processing user requests for data.

Figure 3:
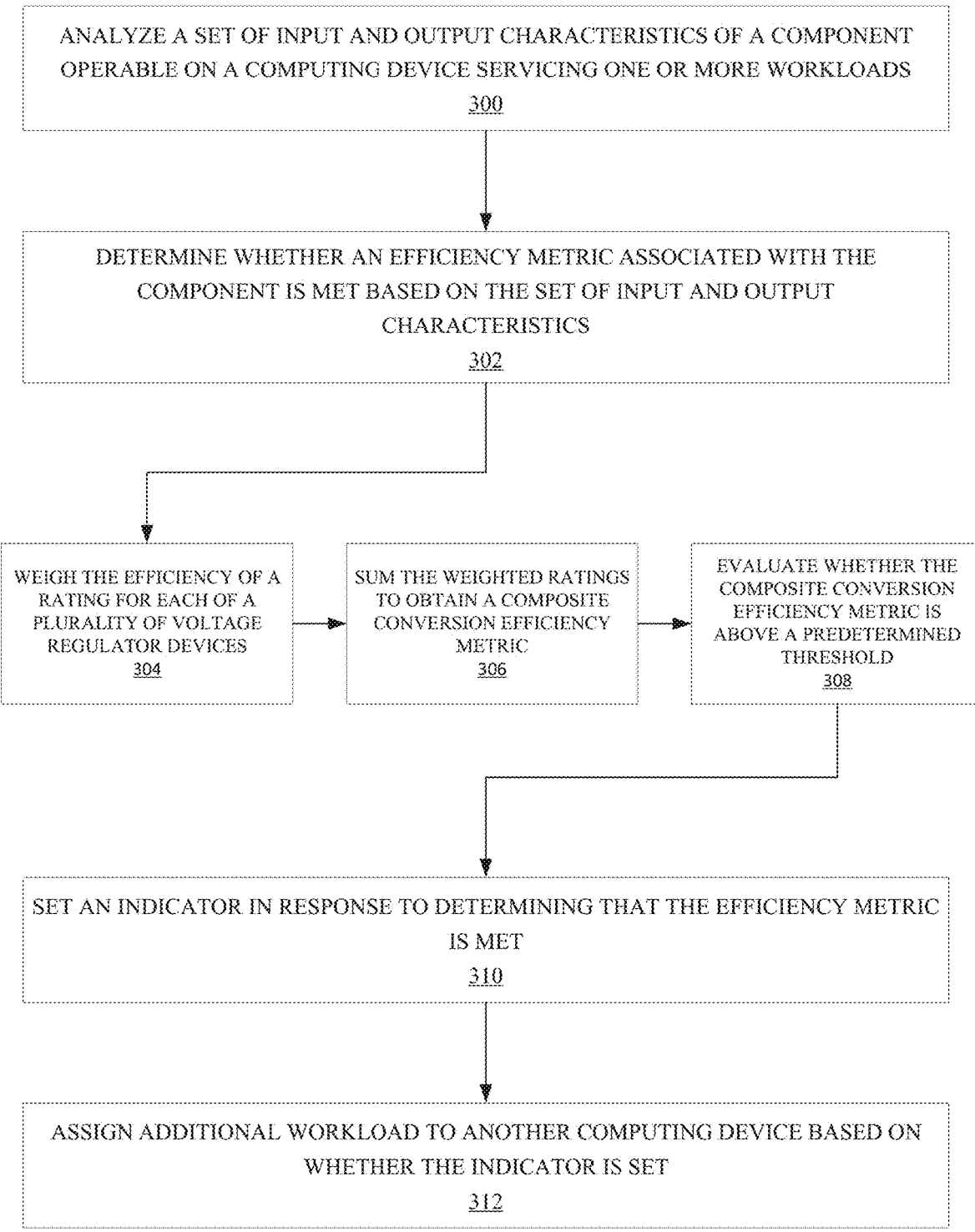
FIG. 3 is a flow chart of an example method for determining whether the efficiency metric is met in accordance with embodiments of the present disclosure.

The method of FIG. 2 also includes determining 202 whether an efficiency metric associated with the component is met based on the set of input and output characteristics. In an example, the efficiency metric is a composite conversion efficiency metric as obtained from a plurality of VRDs attached to a plurality of computing devices 100. FIG. 3, as subsequently described, illustrates the determining step 202. In an example, the input and output characteristics include voltage, current, and power measurements. Continuing this example, the VRD is used to directly measure the voltage and current measurements from which the power and efficiency metric can be calculated. The method further includes setting 204 an indicator in response to determining 202 that the efficiency metric is met. In one example, the indicator can be an external pin or flag that becomes activated once the efficiency manager 102 determines that the efficiency metric has been met. Further, the method includes assigning 206 additional workload to another computing device 100 based on whether the indicator is set.

Now referring to FIG. 3, this figure illustrates a flow chart of an example method for determining 302 whether an efficiency metric associated with the component is met based on the set of input and output characteristics. Initially, the method includes analyzing 300 a set of input and output characteristics of a component operable on a computing device 100 servicing one or more workloads. The method further includes determining 302 whether an efficiency metric associated with the component is met based on the set of input and output characteristics. The method then includes weighing 304 the efficiency of a rating for each of a plurality of VRDs. The method then includes summing 306 the weighted ratings to obtain a composite conversion efficiency metric value. The method then includes evaluating 308 whether the composite conversion efficiency metric is above a predetermined threshold. The method further includes setting 310 an indicator in response to determining that the efficiency metric is met. Further, the method includes assigning 312 additional workload to another computing device 100 based on whether the indicator is set.

Figure 4:
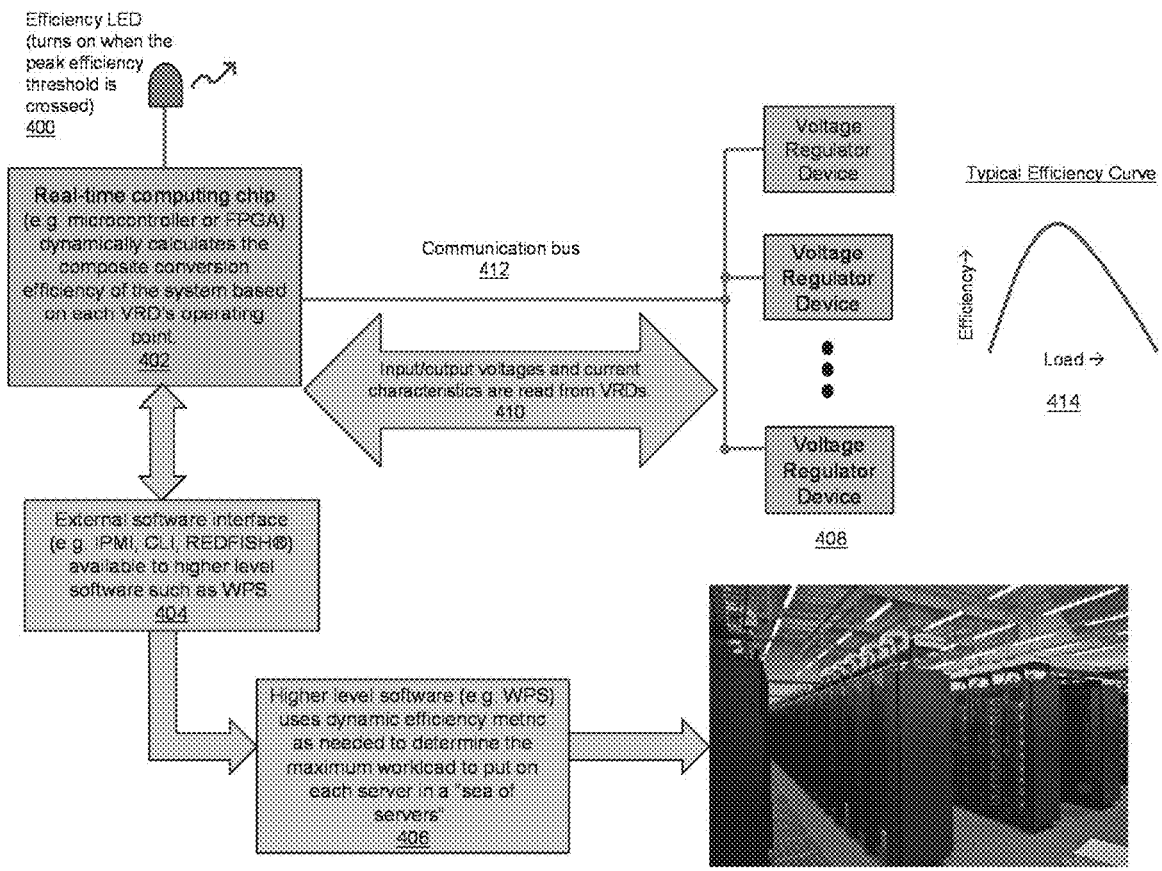
FIG. 4 is a high-level flowchart showing an example embodiment of the presently disclosed subject matter as well as an example of its real-world application and implementation.

FIG. 4 is a high-level flowchart showing an example embodiment of the presently disclosed subject matter as well as an example of its real-world application and implementation. The raw data comprising a set of input and output characteristics are gathered by a plurality of operable components, such as a voltage regulator device (VRD) 408, that are each attached to a plurality of computing devices 100. Via a communication mechanism, such as a communication bus 412, the VRDs 408 provide this raw data to the real-time computing chip 402, allowing the chip to read 410 the raw data. In an example, the real-time computing chip 402 can be a microcontroller or a FPGA. The real-time computing chip 402 then calculates the composite conversion efficiency in real time and sets an indicator flag, which turns on, in one example, an efficiency light emitting diode (LED) 400, when the real-time computing chip 402 determines that the peak power efficiency has been achieved 400, i.e. when the efficiency metric has been met 310. The indicator 400 is then made available to a management controller such as a systems management controller (SMC) or a baseboard management controller (BMC). The management controller then puts the data obtained from the real-time computing chip 402 into the correct format using an external software interface 404 so that it may be used externally by a higher-level software 406 such as a workload placement software (WPS) to evaluate the assigning of workloads. In an example, an external software interface 404 such as an Intelligent Platform Management Interface (IPMI), a command line interface (CLI), or REDFISH® is used by the management controller to prepare the indicator for the WPS 406. The WPS 406 can then use the indicator to determine if the computing device 100 has reached peak power efficiency, which is denoted by the setting of the indicator. In an example, the computing device 100 is a server 416 in a datacenter. Since the indicator is set 400, the WPS 406 will then assign additional workloads to another server 416 that does not have a set indicator, denoting that this server has yet to reach peak power efficiency. Since efficiency operates on a bell-shaped curve 414, real-time monitoring and feedback are needed so that the WPS 406 can ensure the server 416 will operate in the peak power efficiency region of the efficiency curve 414.

Examples that can embody the presently disclosed subject matter are now described in more detail. In an initial example, each of a plurality of computing devices 100 may be a suitable computer, such as a laptop computer or a desktop computer, containing an operable component, such as a VRD 408, that is attached to each of the plurality of computing devices 100. The VRD 408 obtains the raw voltage and current data, comprising a set of input and output characteristics, used for analysis 300 of the computing device 100 servicing one or more workloads. From this analysis, it is then determined 302 whether a composite conversion efficiency metric associated with the VRD 408 is met. Since there can be multiple VRDs 408 attached to a plurality of computing devices 100, a composite conversion efficiency metric must be calculated. Initially, the efficiency rating for each VRD 408 are weighted 304. Subsequently, the weighted ratings are summed 306 to obtain a composite conversion efficiency metric. The composite conversion efficiency metric may subsequently be evaluated 308 to ascertain whether it is above a predetermined threshold. In an example, the predetermined threshold is a programmable threshold that is set by a user to signify that the composite efficiency metric has reached a level considered to be high efficiency. Since the conversion efficiency metric lies on a Gaussian distribution curve 414, i.e. a bell-shaped curve, the purpose of setting this threshold is to ensure that the computing device 100 is operating in the peak power efficiency region. This allows the computing device 100 and its processor and memory 104 to operate more efficiently regarding storage, speed, and operating resources because the computing device 100 will not be under or over utilizing the power consumption.

Returning now to the calculation, once it is determined that the composite conversion efficiency metric is above the predetermined threshold, an indicator, such as a flag or an external pin, is set 310. In one example, a real-time computing chip 402, such as a microcontroller or a FPGA, makes the determination and calculation as stated in steps 302-308 from the raw data collected from the VRDs 408. Then, the microcontroller or FPGA 402 sets 310 the indicator. Essentially, the real-time computing chip 402 manages the real-time state of the indicator. The indicator is then made available to a management controller such as a systems management controller (SMC) or a baseboard management controller (BMC). The management controller then puts the data obtained from the real-time computing chip 402 into the correct format via an external software interface 404 so that it may be used externally by a higher-level software 406 such as a workload placement software (WPS) to evaluate the assigning 312 of workloads. This is beneficial because it allows for the efficiency metric, specifically the composite conversion efficiency metric, to be available for real-time feedback to a higher-level software 406. In an example, an external software interface 404 such as an Intelligent Platform Management Interface (IPMI), a command line interface (CLI), or REDFISH® is used by the management controller to prepare the indicator for the WPS 406. The WPS 406 and management controller can communicate with one another using, in one example, a backend bus. As such, the WPS 406 can request the indicator from the management controller.

As additional workloads are being placed onto the computing device 100, the WPS 406 uses the indicator to determine if the computing device 100 has reached peak power efficiency, which is denoted by the setting of the indicator. Once the indicator is set, then the WPS 406 can consume, i.e. use, the indicator as it assigns 312 the additional workload to another computing device 100 that does not have a set indicator. In this manner, the WPS 406 is able to utilize and possess real-time feedback monitoring of workloads that are placed onto the computing device 100. By doing so, the WPS 406 can prevent additional workloads from being assigned to the computing device 100 that has a set indicator and instead, move to another computing device 100 that does not have a set indicator and assign the workload there instead. This is beneficial because if additional workloads are placed onto a computing device 100 that is already operating at peak power efficiency, the power efficiency will decrease due to the bell-shaped nature of the efficiency curve 414. Hence, the computing device 100 would then operate at sub-par levels of efficiency.

The above initial example has described in detail a possible embodiment of the presently disclosed subject matter. In doing so, it illustrates that the presently disclosed subject matter provides an elegant, simple-to-implement, and cost-effective solution by allowing real-time feedback monitoring of computing devices 100 and their workloads. Furthermore, the disclosed method can be implemented regardless of the type of workload handled by the computing device 100 and correspondingly, the management controller and the higher-level software 406 because the method would work "out of band" of the computing device's 100 processor and memory 104. This is because the real-time computing chip 402, such as the microcontroller or the FPGA, does the determination and calculation of the raw input and output characteristics data obtained from the VRD 408 and this chip does not run under the computing device's 100 operating system and processor and memory 104. Thus, the presently disclosed method can be implemented across-the-board when desired without the need for tailoring to a particular computing device 100 and its processor and memory 104, thereby creating an elegant, simple-to-implement, and cost-effective solution.

In another example, a computing device 100 may be a plurality of servers 416 in a datacenter. Similar to the initial example, once the composite conversion efficiency threshold is met 302 and an indicator is set 310 on a particular server, then the higher-level software 406 can be alerted to stop putting additional workloads onto that particular server in favor of moving the additional workloads to another server that does not have a set indicator.

In another example, a computing device 100 may be a type of network device such as a router or a switch. The peak efficiency mode on the device can be selected to enable the presently described method. Similar to the initial example, once the composite conversion efficiency threshold is met 302 and an indicator is set 310 on a particular network device, then a hardware on the network device can be alerted to stop putting additional workloads onto that particular network device in favor of moving the additional workloads to another network device that does not have a set indicator.

In yet another example, a computing device 100 may be a mobile computing device or a battery powered Internet of Things (IoT) device. The composite conversion efficiency metric in this case is related to a battery's charge. When the battery reaches a predetermined threshold indicating some remaining amount of battery charge left, then this signifies that the indicator should be monitored. The indicator is monitored by a higher-level software 406 to determine if the indicator has been set 310 yet. Once the composite conversion efficiency threshold is met 302 and the indicator is set 310, the higher-level software 406 will clip the maximum central processing unit (CPU) frequency since the peak power efficiency on the device has been achieved.

In yet another example, a computing device 100 may be a type of consumer device such as a smart television or a high definition television or a video disc player (e.g. BLU-RAY DISC®, BLU-RAY 3-D®, or the like). The peak efficiency mode on the device can be selected to enable the presently described method. Similar to the initial example, once the composite conversion efficiency threshold is met 302 and an indicator is set 310 on a particular consumer device, then the higher-level software 406 can be alerted to stop putting additional workloads onto that particular device in favor of moving the additional workloads to another device that does not have a set indicator. However, consumer devices might not possess the minimum speed required to process the data regarding the composite conversion efficiency metric. In which case, they may require an additional element for the presently disclosed method to run. That is, they require, in one example, the addition of a pseudocode to set the minimum speed to process the data since this minimum speed is not reached by the device in its current state. One example of a pseudocode may be the following, wherein the efficiency_flag denotes the indicator:

While (efficiency_flag==0)
        operating_speed++;
    If operating_speed is <MIN_SPEED, operating_speed= MIN_SPEED;

This example code performs an evaluation of the efficiency_flag and covers the case where a lower limit in speed is required to process the data on the consumer device. When the condition that the efficiency_flag is zero is true, then the While loop is triggered and the operating_speed is incremented, i.e. increased by 1. In the case where the efficiency_flag is set to 1 in the first few iterations of the While loop, then the code will break out of the loop but the operating_speed at this point may be too slow to process the data since the peak power efficiency may be at very light loads. Thus, the operating_speed gets adjusted via the If statement to a MIN_SPEED so that the device can operate properly. That is, if the operating_speed is less than the MIN_SPEED required for processing the data, then we assign the MIN_SPEED value to the operating_speed. Basically, we set the operating_speed as the MIN_SPEED.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method comprising:

analyzing a set of input and output voltage and current characteristics of a component operable on a first computing device servicing one or more workloads;

determining a conversion efficiency metric associated with the component based on the analyzed set of input and output voltage and current characteristics of the component;

setting an indicator associated with the first computing device based on the determined conversion efficiency metric;

determining whether a second computing device does not have an associated indicator set;

assigning an additional workload to the second computing device in response to the indicator associated with the second computing device not being set.

2. The method of claim 1, wherein the component is a voltage regulator device.

3. The method of claim 1, wherein the set of input and output characteristics comprises a voltage characteristic, a current characteristic, and a power characteristic.

4. The method of claim 1, wherein the efficiency metric is a composite conversion efficiency metric.

5. The method of claim 1, wherein the indicator comprises one of a flag and an external pin.

6. The method of claim 1, wherein setting the indicator comprises setting the indicator on a systems management controller followed by externally setting the indicator on a workload placement manager.

7. The method of claim 1, wherein setting the indicator comprises real-time feedback monitoring of the indicator by a workload placement manager as the workload is being placed on the second computing device.

8. The method of claim 1, wherein assigning additional workload to the second computing device comprises consuming, by a workload placement manager, the indicator when a composite conversion efficiency metric is above a predetermined threshold.

9. The method of claim 1, further comprising:
preventing the additional workload from being assigned to the second computing device when a predetermined threshold has been met; and
wherein the method further comprises:
determining whether the second computing device is not associated with a set indicator, and
assigning the additional workload to the second computing device in response to determining that the indicator is not associated with the set indicator.

10. A computing device comprising:
an efficiency manager including at least one a processor and memory configured to:
analyze a set of input and output voltage and current characteristics of a component operable on a first computing device servicing one or more workloads;
determine a conversion efficiency metric associated with the component based on the analyzed set of input and output voltage and current characteristics of the component;
set an indicator associated with the first computing device based on the determined conversion efficiency metric;
determine whether a second computing device does not have an associated indicator set; and
assign an additional workload to the second computing device in response to the indicator associated with the second computing device not being set.

11. The computing device of claim 10, wherein the component is a voltage regulator device.

12. The computing device of claim 10, wherein the set of input and output characteristics comprises a voltage characteristic, a current characteristic, and a power characteristic.

13. The computing device of claim 10, wherein the efficiency metric is a composite conversion efficiency metric.

14. The computing device of claim 10, wherein the indicator comprises one of a flag and an external pin.

15. The computing device of claim 10, wherein the efficiency manager is configured to set the indicator on a systems management controller followed by externally setting the indicator on a workload placement manager.

16. The computing device of claim 10, wherein the efficiency manager is configured to provide real-time feedback monitoring of the indicator by a workload placement manager as the workload is being placed on the second computing device.

17. The computing device of claim 10, wherein the efficiency manager is configured to consume, by a workload placement manager, the indicator when a composite conversion efficiency metric is above a predetermined threshold.

18. The computing device of claim 10, wherein the efficiency manager is configured to:
prevent the additional workload from being assigned to the second computing device when a predetermined threshold has been met;
determine whether the second computing device is not associated with a set indicator; and
assign the additional workload to the second computing device in response to determining that the indicator is not associated with the set indicator.

19. The method of claim 1, further comprising:
weighing an efficiency of a rating based on the set of input and output voltage and current characteristics associated with the component; and
summing each of the weighted ratings to generate a composite conversion efficiency metric.

20. The computing device of claim 10, wherein the efficiency manager is further configured to:
weigh an efficiency of a rating based on the set of input and output voltage and current characteristics associated with the component; and
sum each of the weighted ratings to generate a composite conversion efficiency metric.

* * * * *